United States Patent
Iwasaki et al.

(10) Patent No.: US 9,508,000 B2
(45) Date of Patent: Nov. 29, 2016

(54) OBJECT RECOGNITION APPARATUS

(71) Applicant: HONDA MOTOR CO., LTD., Minato-Ku, Tokyo (JP)

(72) Inventors: Shun Iwasaki, Saitama (JP); Keisuke Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/748,416

(22) Filed: Jun. 24, 2015

(65) Prior Publication Data
US 2015/0379334 A1  Dec. 31, 2015

(30) Foreign Application Priority Data

Jun. 30, 2014 (JP) ................. 2014-134670

(51) Int. Cl.
G06K 9/00  (2006.01)
(52) U.S. Cl.
CPC ....... G06K 9/00362 (2013.01); G06K 9/00805 (2013.01)
(58) Field of Classification Search
None
See application file for complete search history.

(56) References Cited

U.S. PATENT DOCUMENTS

| | | | | |
|---|---|---|---|---|
| 7,418,112 B2* | 8/2008 | Ogasawara | ........ | G06K 9/00369 348/143 |
| 8,131,079 B2* | 3/2012 | Hayasaka | .......... | G06K 9/00362 382/181 |
| 2007/0222565 A1* | 9/2007 | Kawamata | .......... | B60R 21/0134 340/435 |

FOREIGN PATENT DOCUMENTS

JP  2007-279808 A  10/2007

* cited by examiner

Primary Examiner — Shefali Goradia
(74) Attorney, Agent, or Firm — Carrier Blackman & Associates, P.C.; Joseph P. Carrier; Jeffrey T. Gedeon

(57) ABSTRACT

An object recognition apparatus 10 includes a candidate image extraction unit 12 which extracts a candidate image part 22 from a pickup image 21, a distance calculation unit 13 which calculates the distance of the candidate image part 22, and a candidate image determination unit 14 which determines that, in the case where a predetermined k number or more of the candidate image parts 22, the real space positions of which belong to a determination area R having the distance thereof lying within the range of a second predetermined distance exceeding a first predetermined distance and the width thereof being a predetermined width or less, are extracted, the candidate image parts 22 which belong to the determination area R are less likely to be the image parts of a pedestrian.

18 Claims, 5 Drawing Sheets

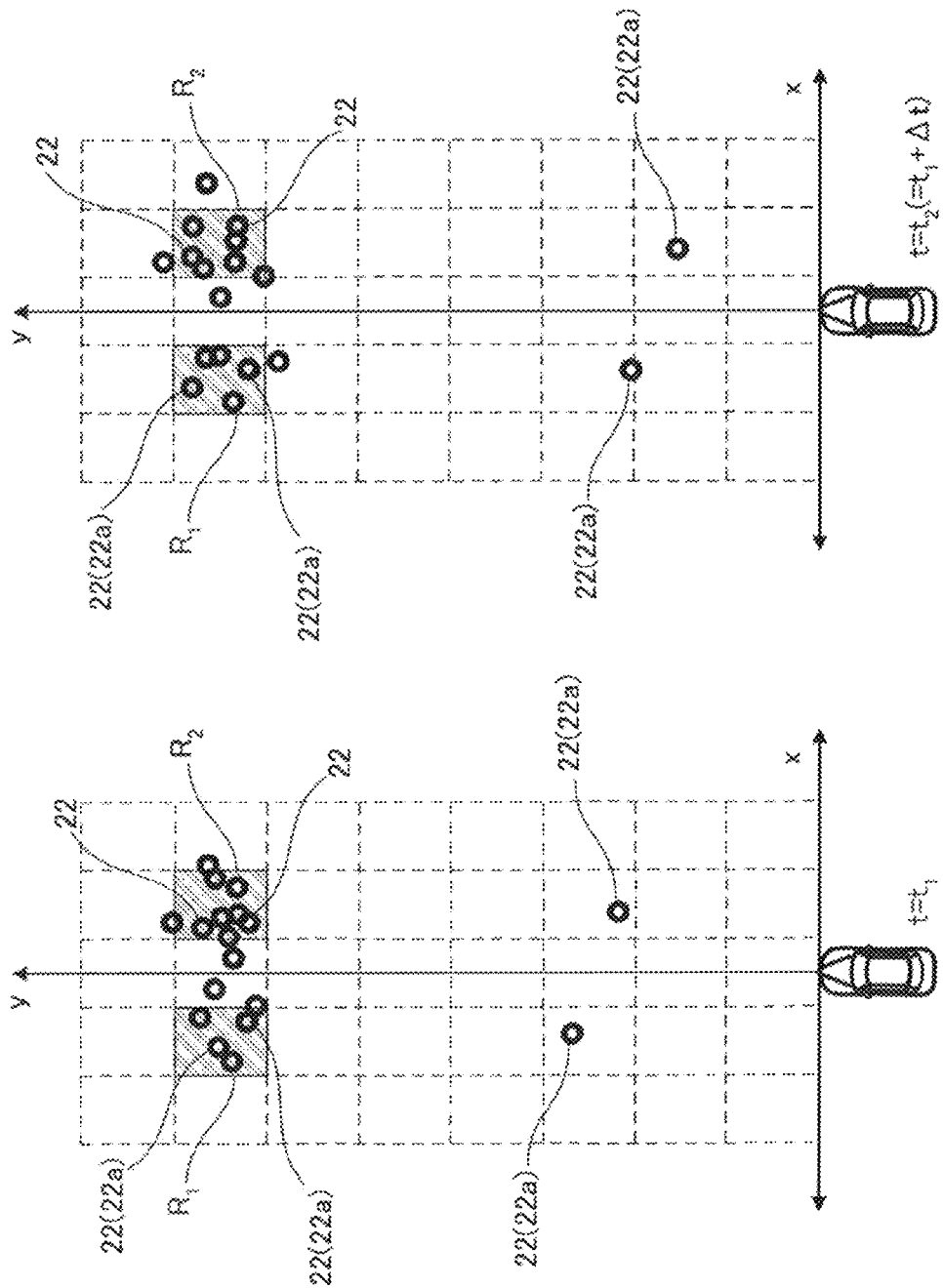

OBJECT RECOGNITION APPARATUS

CROSS-REFERENCE TO RELATED APPLICATIONS

The present application claims priority under 35 USC 119 to Japanese Patent Application No. 2014-134670 filed Jun. 30, 2014 the entire contents of which are hereby incorporated by reference.

BACKGROUND OF THE INVENTION

Field of the Invention

The present invention relates to an object recognition apparatus configured to recognize an object on the basis of a pickup image of a camera.

Description of the Related Art

Hitherto, there has been known an object recognition apparatus adapted to recognize a pedestrian, contact with whom is to be avoided by a vehicle, from an image of a road ahead of the vehicle acquired by a camera mounted in the vehicle (refer to, for example, Japanese Patent Application Laid-Open No. 2007-279808).

According to the object recognition apparatus described in the foregoing publication, an image part of an object existing around a vehicle (a candidate of an image part of a pedestrian) is extracted from an image acquired by a camera, and then it is identified whether or not the image part of the object is an image part of a pedestrian. Thereafter, the orientation of the pedestrian in the image part that has been identified as the image part of the pedestrian is determined, and it is further determined whether the contact of the vehicle with the object is to be avoided. Then, a notice is given to a driver on the basis of the result of the determination.

An identifying technique as a method of identifying whether or not the image part of an object is the image part of a pedestrian is based on the characteristics indicating the shape of an object, such as the aspect ratio of the image part of an object, the ratio between the area of the image part of the object and the area of a circumscribed quadrangle of the image part of the object, or the characteristics, such as the size of the image part of the object and the luminance dispersion on a grayscale image.

However, when recognizing a pedestrian from a pickup image of a camera, if multiple candidates of the image parts of the pedestrian are extracted, then each of the candidates has to be checked to identify whether or not the candidate is the image part of the pedestrian, thus presenting a problem of prolonged time required for recognizing the pedestrian.

SUMMARY OF THE INVENTION

The present invention has been made in view of the aforesaid background, and an object of the invention is to provide an object recognition apparatus capable of shortening the time required for recognizing a pedestrian when multiple candidates of an image part of the pedestrian are extracted from a pickup image of a camera.

An object recognition apparatus in accordance with the present invention includes:

a candidate image extraction unit that extracts a candidate image part, which is an image part of an object that may be a pedestrian, from a pickup image of a camera;

a distance calculation unit that calculates a distance between a corresponding real space position and the camera on the candidate image part extracted by the candidate image extraction unit; and a candidate image determination unit which determines that, in a case where a first predetermined number or more candidate image parts whose corresponding real space positions belong to a determination area, a distance of which from the camera in an imaging direction of the camera lies within a range of a first predetermined distance or more and a second predetermined distance or less and a width of which in a horizontal direction orthogonal to the imaging direction is a predetermined width or less, are extracted by the candidate image extraction unit, the candidate image parts having the corresponding real space positions thereof belonging to the determination area have low possibility to be image parts of a pedestrian.

The object recognition apparatus in accordance with the present invention first extracts candidate image parts, which are image parts of an object that may be a pedestrian, from a pickup image of a camera by a candidate image extraction unit.

Then, the distance calculation unit calculates the distance of the corresponding real space position from the camera for the candidate image parts extracted by the candidate image extraction unit.

Next, the candidate image determination unit counts, among the candidate image parts extracted by the candidate image part extraction unit, the candidate image parts having the corresponding real space positions thereof belonging to a determination area, the distance of which from the camera in the imaging direction of the camera is within the range of a first predetermined distance or more and a second predetermined distance or less and the width of which in a horizontal direction orthogonal to the imaging direction is a predetermined width or less. Then, if the first predetermined number or more of the candidate image parts having the corresponding real space positions thereof belonging to the determination area are extracted, then these candidate image parts are determined have low possibility to be the image parts of a pedestrian.

The object recognition apparatus in accordance with the present invention makes it possible to identify the candidate image parts that are less likely to be the image parts of a pedestrian by the simple arithmetic processing performed by the candidate image determination unit, thus enabling to shorten the time required for recognizing a pedestrian when a plurality of candidate image parts are extracted.

The determination area refers to an area that satisfies the foregoing conditions in the pickup image or an area that satisfies the foregoing conditions when the pickup image is converted to a real space.

Further, the case where "the candidate image parts whose corresponding real space positions belong to a determination area, the distances of which from the camera in the imaging direction of the camera are within a range of a first predetermined distance or more and a second predetermined distance or less and the width of which in a horizontal direction orthogonal to the imaging direction is a predetermined width or less, are extracted" is exemplified by a case where the image parts of multiple trees, a series of mountains or the like which exist in the distance corresponding to a distance within the range of the first predetermined distance or more and the second predetermined distance or less in the imaging direction of the camera are extracted as candidate image parts.

The object recognition apparatus in accordance with the present invention preferably includes a pedestrian image identification unit that performs pedestrian identification processing for identifying whether or not candidate image parts, with respect to candidate image parts excluding candidate image parts identified by the candidate image determination unit as having low possibility to be image parts of a pedestrian among candidate image parts extracted by the candidate image extraction unit, are image parts of a pedestrian.

With this arrangement, the pedestrian image identification unit performs the pedestrian identification processing on the remaining candidate image parts after excluding the candidate image parts identified by the candidate image determination unit less likely to be the image parts of a pedestrian among the candidate image parts extracted by the candidate image extraction unit. This makes it possible to reduce the number of candidate image parts to be processed in the pedestrian identification processing, thereby shortening the time required for identifying a pedestrian.

Further, in the object recognition apparatus in accordance with the present invention, the determination may be carried out by using one image acquired at one point of time. Alternatively, however, the determination can be carried out by using a plurality of pickup images continuously acquired over time.

For example, the candidate image determination unit may determine the candidate image determination unit determines the type of object of candidate image parts in the determination area in the case where the first predetermined number or more of the candidate image parts are extracted in the determination area in each of pickup images of a predetermined number or more that have been continuously acquired over time or a average number of times of extraction of the candidate image parts extracted in the determination area of each of the pickup images is a second predetermined number or more.

Alternatively, the candidate image determination unit may determine the type of object of candidate image parts in the determination area in the case where, in a predetermined number or more pickup images continuously acquired over time, the first predetermined number or more candidate image parts are extracted in the determination area of the pickup image acquired at a first point of time and the first predetermined number or less and a third predetermined number or more of the candidate image parts are extracted in the determination area of each of pickup images acquired at different points of time after the first point of time.

According to these methods, the accuracy level of the determination of the type of object can be enhanced, as compared with the case where the determination is carried out by using only one pickup image acquired at one point of time.

In this case, the predetermined number of pickup images continuously acquired over time may be changed according to the travel speed of the vehicle in which the camera is mounted.

Further, the candidate image determination unit preferably continues the determination of the type of object until a predetermined time elapses after determining the type of object of the candidate image parts in the determination area.

This arrangement makes it possible to prevent the determination of the type of object from being changed within the predetermined time due to the influence of a noise or the like after the candidate image determination unit determines the type of object of the candidate image parts in the determination area.

BRIEF DESCRIPTION OF THE DRAWINGS

FIG. 4A and FIG. 4B are explanatory diagrams illustrating a processing for calculating a distance, wherein FIG. 4A illustrates a pickup image 21 and FIG. 4B illustrates a method for calculating a distance; and FIG. 5A and FIG. 5B are explanatory diagrams illustrating the positions of coordinates of candidate image parts in pickup images, which have been converted to real coordinates, wherein FIG. 5A illustrates a pickup image acquired at point of time t1, and FIG. 5B illustrates a pickup image acquired at point of time t2.

DESCRIPTION OF THE PREFERRED EMBODIMENTS

An embodiment of an object recognition apparatus in accordance with the present invention will be described with reference to FIG. 1 to FIG. 5.

Figure 1:
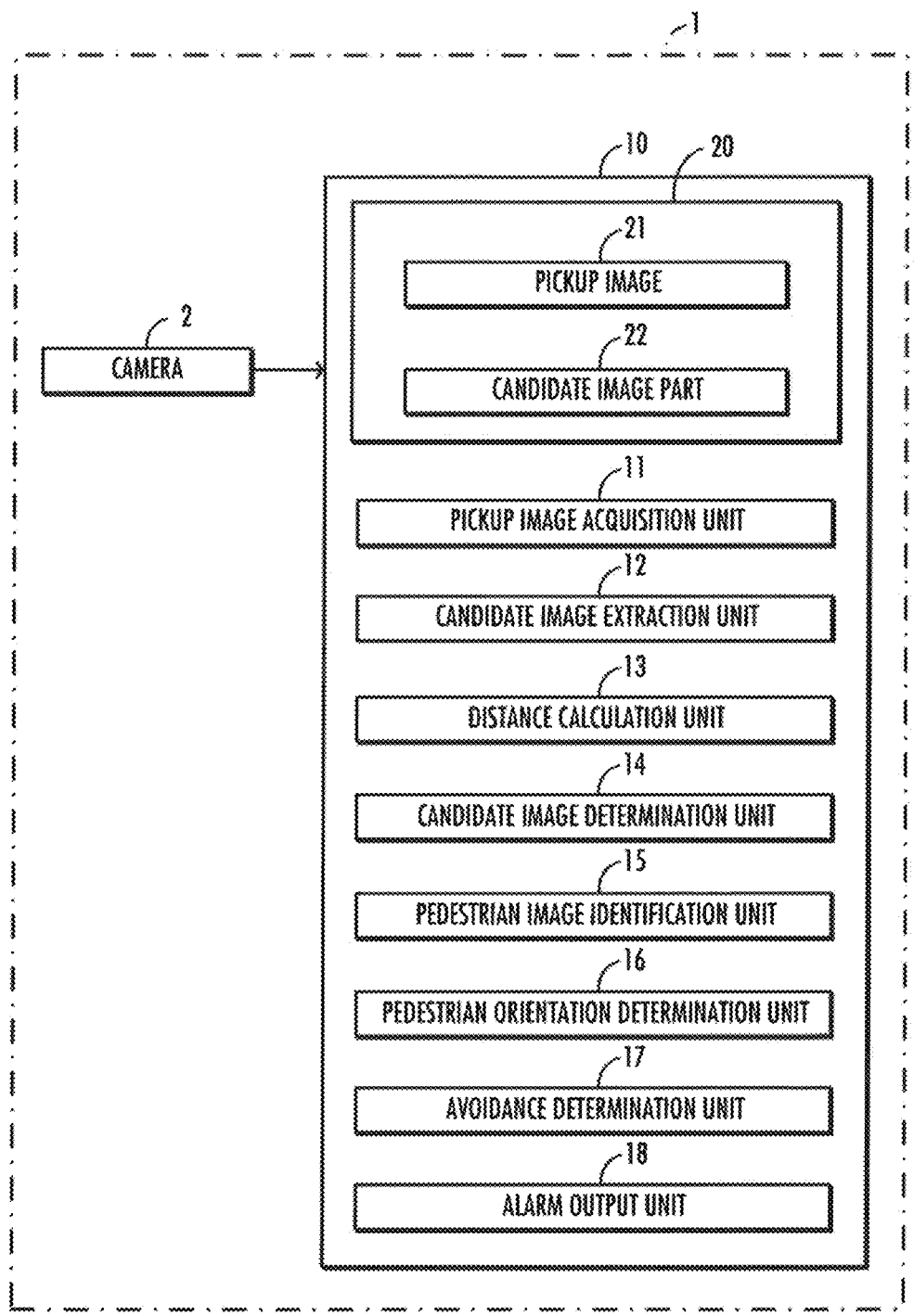
FIG. 1 is a block diagram of an object recognition apparatus.

Referring to FIG. 1, an object recognition apparatus 10 is mounted in a vehicle 1 provided with a camera 2 (color camera).

The object recognition apparatus 10 is an electronic unit constituted of a CPU, memories, various types of interface circuits and the like (not illustrated), and functions as a pickup image acquisition unit 11, a candidate image extraction unit 12, a distance calculation unit 13, a candidate image determination unit 14, a pedestrian image identification unit 15, a pedestrian orientation determination unit 16, an avoidance determination unit 17, and an alarm output unit 18 by executing an object recognition program, which is retained in a memory, by the CPU.

Figure 2:
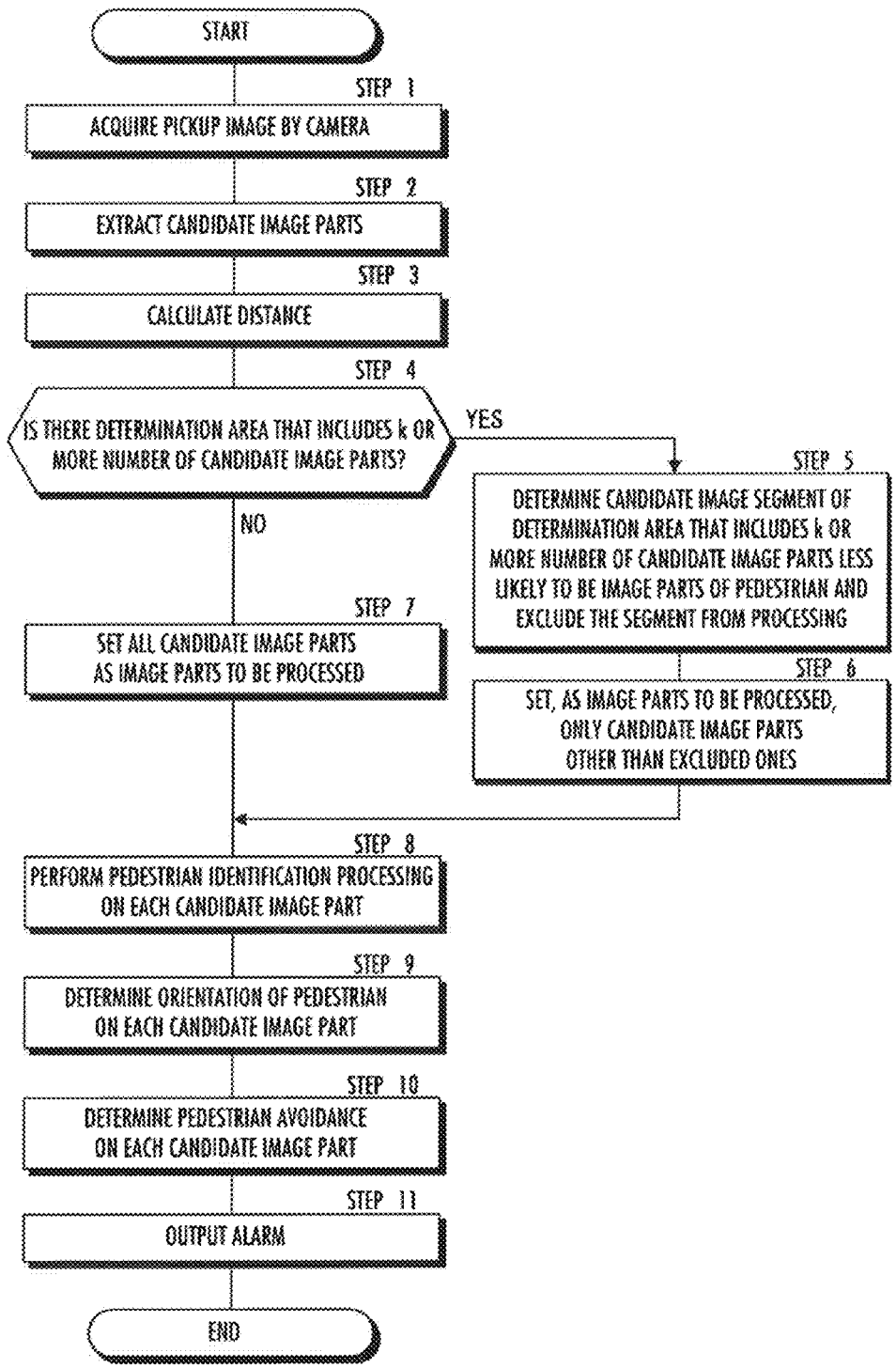
FIG. 2 is a flowchart of a processing performed by the object recognition apparatus.

According to the flowchart given in FIG. 2, the following will describe the processing for recognizing an object (a person, a bicycle or the like) that exists on a road, which is performed by the object recognition apparatus 10. The object recognition apparatus 10 performs the processing at every predetermined control cycle according to the processing in the flowchart given in FIG. 2 to recognize an object (pedestrian) existing on the road on which the vehicle 1 is traveling, determine whether the object is an object with which the vehicle 1 should avoid contact, and notify a driver.

The processing in STEP1 of FIG. 2 is performed by the pickup image acquisition unit 11. The pickup image acquisition unit 11 receives video signals of the surrounding area (front area) of the vehicle 1 output from the camera 2 mounted in the vehicle, and subjects the color components (R value, G value, and B value) of the video signals to demosaicing so as to acquire a color pickup image having the R value, G value and the B value as the data of each pixel. The data of the color pickup image in front of the vehicle 1 is retained in an image memory 20. Then, the color pickup image is converted to generate a grayscale pickup image (hereinafter referred to as "the pickup image") 21, and the generated pickup image is retained in the image memory 20.

Figure 3:
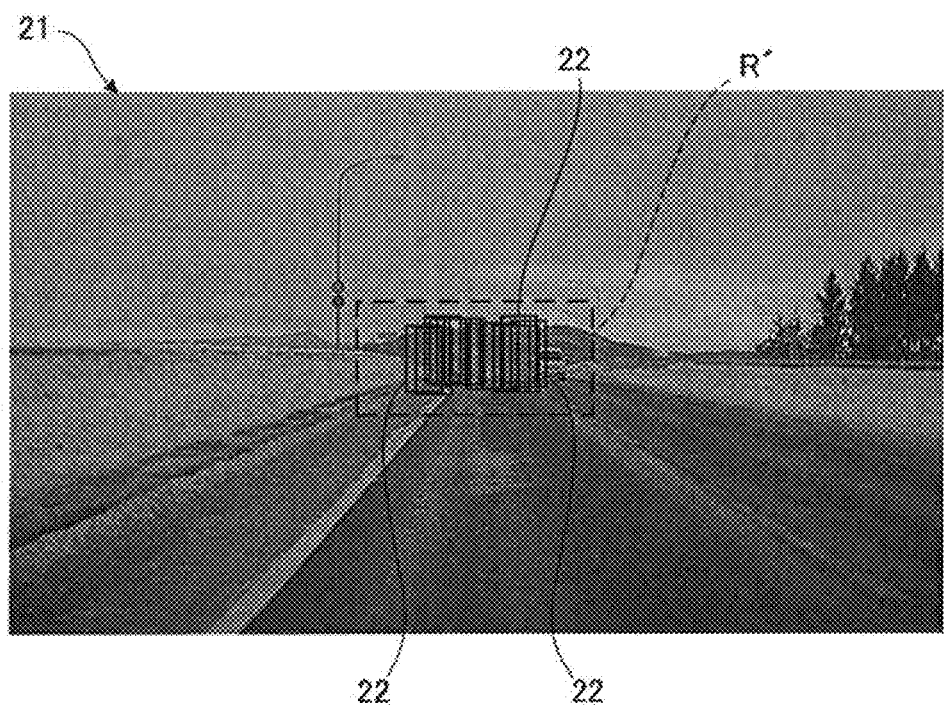
FIG. 3 is an explanatory diagram illustrating candidate image parts in a pickup image.

The processing in next STEP2 is performed by the candidate image extraction unit 12. The candidate image extraction unit 12 extracts candidate image parts 22, which are image parts of an object that may be a pedestrian, from a pickup image 21. For example, FIG. 3 illustrates the image parts of faraway mountains extracted as a plurality of candidate image parts 22.

The candidate image parts 22 are extracted from the pickup image 21 by, for example, searching for areas having the quantity of characteristics of a pedestrian in the pickup image 21 of the grayscale. The search for a pedestrian in STEP2 is performed using the data of a simple dictionary, which has been set more loosely than in the processing of identifying a pedestrian in STEP8, which will be discussed later.

Subsequently, the processing in STEP3 is performed by the distance calculation unit 13. The distance calculation unit 13 calculates the distance between a corresponding real space position and the camera 2 on each of the candidate image parts 22.

Figure 4A:
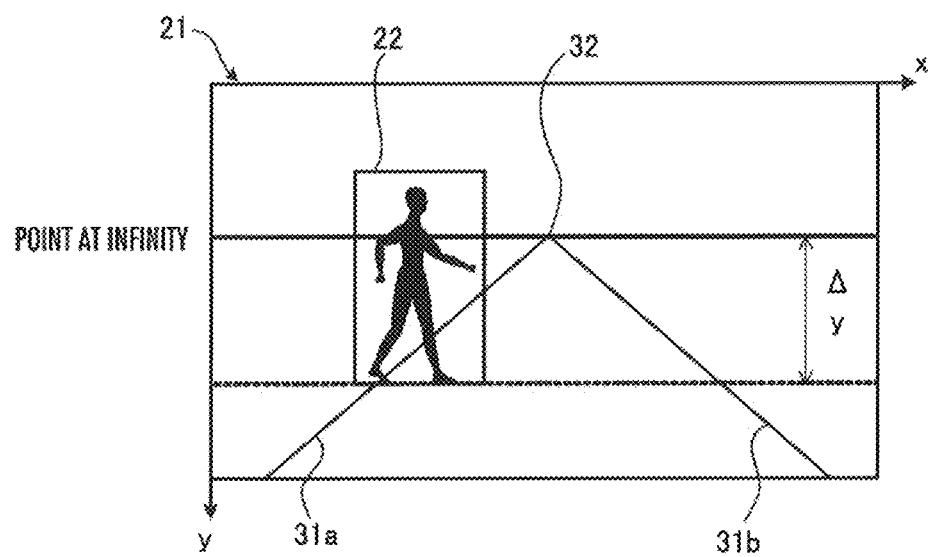
Figure 4B:
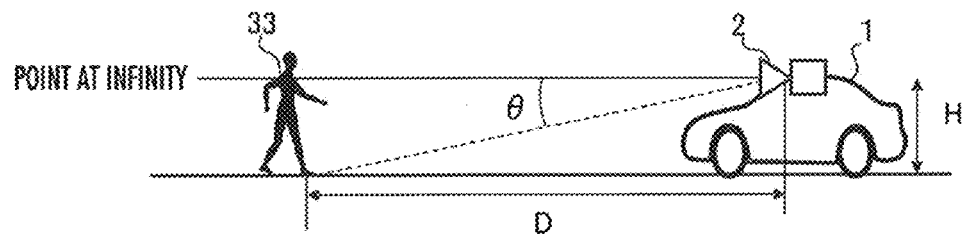

As illustrated in FIG. 4A, the distance calculation unit 13 first determines the coordinate of a road vanishing point 32, which is a point at infinity, from the intersection point of image parts 31a, 31b of lane marks (white lines) that define a driving lane in the pickup image 21 of the camera 2, and determines a difference Δy between the pixel of the road vanishing point 32 and the pixel of the lowest point of the candidate image part 22. Then, as illustrated in FIG. 4B, the distance calculation unit 13 calculates an angle θ relative to the point at infinity according to expression (1) given below and calculates a distance D between the vehicle 1, in which the camera 2 is mounted, and an object 33, i.e. the distance between the vehicle 1 and the corresponding real space position of the candidate image part 22, according to expression (2) given below. H denotes the height of the camera 2 and "focal" denotes the focal distance of the camera 2.

$$\tan \theta = \Delta y/\text{focal} \quad (1)$$

$$D = H/\tan \theta \quad (2)$$

The processing in subsequent STEP4 to STEP7 is performed by the candidate image determination unit 14.

In STEP4, the candidate image determination unit 14 first maps the coordinate positions of the candidate image parts 22 in the pickup image 21 on real coordinates on the basis of the distances calculated by the distance calculation unit 13 and the positions in the horizontal direction in the pickup image 21, as illustrated in FIG. 5A.

Next, the candidate image determination unit 14 sets, as determination areas $R_1$, $R_2$ (the hatched portions in the drawing; hereinafter referred to simply as "the determination areas R" in some cases), the areas, the distance of each of which from the camera 2 in the traveling direction of the vehicle 1 (the imaging direction of the camera 2) is in the range of a first predetermined distance or more and a second predetermined distance or less and the width of each of which in the horizontal direction orthogonal to the traveling direction of the vehicle 1 is within a predetermined width range, as illustrated in FIG. 5A. In the present embodiment, the two determination areas $R_1$, $R_2$ are set. However, the number of the determination areas may be set to one, or three or more. Further, all areas imaged by the camera 2 may be set as a single determination area R insofar as the areas are such that the distances thereof from the camera 2 in the traveling direction of the vehicle 1 are within the range of the first predetermined distance or more and the second predetermined distance or less and the widths thereof in the horizontal direction orthogonal to the traveling direction of the vehicle 1 are within the predetermined width range.

Subsequently, among the candidate image parts 22 extracted by the candidate image extraction unit 12, the candidate image parts 22, the corresponding real space positions of which belong to each of the determination area $R_1$, $R_2$, are counted. If there is one or more determination areas R, each of which includes a k number ("k" corresponding to a first predetermined number in the present invention) or more of the candidate image parts 22 that belong to the determination area R, then the procedure proceeds to STEP5. If there is no determination area R that includes the k number or more of the candidate image parts 22, then the procedure proceeds to STEP7.

In STEP5, the candidate image determination unit 14 determines that the candidate image parts 22 in the determination area R (e.g. the determination area $R_2$) that includes the k number or more of the candidate image parts 22 among the candidate image parts 22 extracted by the candidate image extraction unit 12 are less likely to be a pedestrian, and proceeds to STEP6, excluding the candidate image parts 22 from those to be processed in STEP8, which will be discussed later.

In STEP6, the candidate image determination unit 14 sets, as the image parts to be processed in STEP8, only the candidate image parts 22 (22a in the drawing) other than the candidate image parts 22 that have been excluded in STEP5, and proceeds to STEP8.

In STEP7, the candidate image determination unit 14 sets, as the image parts to be processed in the next STEP8, all the candidate image parts 22 extracted by the candidate image extraction unit 12 and proceeds to STEP8.

In subsequent STEP8, the processing by the pedestrian image identification unit 15 is performed. The pedestrian image identification unit 15 performs pedestrian identification processing on each of the candidate image parts 22 set as the image parts to be processed in STEP6 or STEP7 so as to identify whether or not the candidate image part 22 is an image part of a pedestrian. The candidate image part 22 that has been determined to be an image part of a pedestrian is subjected to the processing performed in STEP9. If the candidate image part 22 is not determined to be an image part of a pedestrian, then the processing by the object recognition apparatus 10 is terminated.

The pedestrian identification processing is performed by, for example, searching for areas that have the quantity of characteristics of a pedestrian in the pickup image 21 of the grayscale.

The processing in STEP9 is performed by the pedestrian orientation determination unit 16. The pedestrian orientation determination unit 16 determines the orientation of a pedestrian on each of the candidate image parts 22 that have been determined to be the image parts of the pedestrian by the pedestrian image identification unit 15.

The processing in subsequent STEP10 is performed by the avoidance determination unit 17. On each of the candidate image parts 22 that have been determined to be the image parts of a pedestrian, it is determined whether or not avoidance is necessary (whether there is a high possibility of collision with the vehicle 1) according to the orientation of the pedestrian determined by the pedestrian orientation determination unit 16. For example, it is determined that avoidance is necessary if the pedestrian is facing forward (toward the vehicle 1) or the pedestrian positioned on the right side of the vehicle 1 is facing leftward (toward the vehicle 1), whereas it is determined that avoidance is not necessary if the pedestrian positioned on the right side of the vehicle 1 is facing rightward (away from the vehicle 1). If the number of the candidate image parts 22 that have been determined to be image parts of an object to be avoided is one or more, then the processing proceeds to STEP11, or if there is no such candidate image part 22, then the processing by the object recognition apparatus 10 is terminated.

The processing in STEP11 is performed by the alarm output unit 18. The alarm output unit 18 outputs an alarm for the candidate image part 22 that has been determined by the avoidance determination unit 17 as an image part of an object to be avoided among the candidate image parts 22 determined to be the image parts of a pedestrian. The alarm may be output in the form of, for example, an audio guidance or display on a display unit.

As described above, according to the object recognition apparatus 10 of the present embodiment, among the candidate image parts 22 extracted by the candidate image extraction unit 12, the candidate image parts 22 in the determination area R that includes the k number or more of the candidate image parts 22 are determined less likely to be the images of a pedestrian and excluded from the processing thereafter. Further, among the candidate image parts 22 extracted by the candidate image extraction unit 12, the processing thereafter (the processing by the pedestrian image identification unit 15 in STEP8) is performed only on the candidate image part 22 (22a) remaining after excluding as described above.

Further, according to the object recognition apparatus 10 of the present embodiment, the corresponding real space positions of each candidate image parts 22 are mapped on the real coordinates in FIG. 5A, and then the number of the candidate image parts 22 that have the corresponding real space positions lying in the determination area R is counted. As an alternative method, a determination area R', the real space position of which is such that the distance from the camera 2 in the traveling direction of the vehicle 1 lies within the range of a first predetermined distance or more and a second predetermined distance or less and the width of which in the horizontal direction orthogonal to the traveling direction is within a predetermined range, may be set in the pickup image 21 in FIG. 3, and then the number of the candidate image parts 22 that belong to the determination area R' in the pickup image 21 may be counted.

Further, in the present embodiment, the camera 2 is mounted in the vehicle 1. Alternatively, however, the camera 2 may be a camera installed on a side of a road or above a road.

Further, according to the object recognition apparatus 10 of the present embodiment, if there is one or more determination areas R, each of which includes the k number or more of the candidate image parts 22, in a single pickup image 21 acquired at one point of time, then the candidate image determination unit 14 determines in STEP4 to STEP5 that the candidate image parts 22 in the determination area R are less likely to be the image parts of a pedestrian. As an alternative method, a plurality of the pickup images 21 continuously acquired over time may be used to carry out the determination. This method will be described below.

The candidate image determination unit 14 first determines whether or not the number of the candidate image parts 22, the corresponding real space positions of which belong to each of the determination areas $R_1$, $R_2$, is the k number or more in a pickup image $21_{t1}$ acquired at a point of time t1 illustrated in FIG. 5A.

If the number of the candidate image parts 22 is the k number or more, then the candidate image determination unit 14 determines whether or not the number of the candidate image parts 22, the corresponding real space positions of which belong to each of the determination areas $R_1$, $R_2$, is a p number or more ("p" corresponding to a third predetermined number in the present invention) in a pickup image $21_{t2}$ acquired at a point of time t2 illustrated in FIG. 5B. "p" may be equal to k or smaller than k.

Further, if the number of the candidate image parts 22 is the p number or more, then the candidate image determination unit 14 determines whether or not the number of the candidate image parts 22, the corresponding real space positions of which belong to each of the determination area $R_1$, $R_2$, is the p number or more in a pickup image $21_{t2}$ acquired at the point of time t2.

Further, if the number of the candidate image parts 22 is the p number or more, then the candidate image determination unit 14 determines whether or not the number of the candidate image parts 22, the corresponding real space positions of which belong to each of the determination areas $R_1$, $R_2$, is the p number or more in a pickup image $21_{t3}$ acquired at a point of time t3.

The candidate image determination unit 14 repeats the above processing, and determines that the candidate image parts 22 that belong to the determination area R are less likely to be the image parts of a pedestrian if the number of the candidate image parts 22, the corresponding real space positions of which belong to the determination area R, is the p number or more in a pickup image $21_{tq}$ acquired at a point of time tq.

According to the method in which a plurality of pickup images $21_{t1}$, $21_{t2}$, $21_{t3}$, ..., $21_{tq}$ continuously acquired over time as described above are used to determine low probability of image parts being a pedestrian, the accuracy of a determination result can be further enhanced, as compared with the method in which only one pickup image 21 acquired at one point of time is used.

In the method described above, the number of the candidate image parts 22 is determined on a q number ("q" corresponding to a predetermined acquisition number in the present invention) of the pickup images $21_{t1}$, $21_{t2}$, $21_{t3}$, ..., $21_{tq}$. However, the predetermined acquisition number q of the pickup images 21 may be changed according to the travel speed of the vehicle 1.

For example, the pickup images from $21_{t2}$ and after, namely, the pickup images $21_{t2}$, $21_{t3}$, ..., $21_{tq}$ in the case where the travel speed is high, capture areas that are farther ahead in terms of the real space positions, as compared with the pickup images $21_{t2}$, $21_{t3}$, ..., $21_{tq}$ in the case where the travel speed is low. Hence, when determining candidate images on areas at the same distance, the candidate image parts 22 can be reliably extracted even when the predetermined acquisition number q of the pickup image 21 is reduced as the travel speed increases. As a result, in the case where the travel speed is high, a reduced number of pickup images 21 is required to make it possible to determine the low probability of image parts being a pedestrian, thus enabling to shorten time for performing the determination.

Further, the method for determining the low probability of image parts being a pedestrian by using the plurality of the pickup images $21_{t1}$, $21_{t2}$, $21_{t3}$, ..., $21_{tq}$ continuously acquired over time is not limited to the foregoing methods. For example, the type of object of the candidate image parts 22 in the determination area R may be determined if the k number or more of the candidate image parts 22 is extracted in the determination area R in each of the pickup images $21_{t1}$, $21_{t2}$, $21_{t3}$, ..., $21_{tq}$, or the average extraction number of the candidate image parts 22 extracted in the pickup images $21_{t1}$, $21_{t2}$, $21_{t3}$, ..., $21_{tq}$ is an r number or more ("r" corresponding to a second predetermined number in the present invention).

Further, in the object recognition apparatus 10 of the present embodiment, the candidate image parts 22 that have once been determined by the candidate image determination unit 14 as an object that is less likely to be a pedestrian in the pickup image 21 acquired at a certain point of time may be determined as an object that is less likely to be a pedestrian also in the pickup images 21 acquired thereafter until a predetermined time elapses from the foregoing point of time. This makes it possible to prevent the result of determination that image parts in the pickup image 21 acquired at a certain point of time are less likely to indicate a pedestrian from being changed within a predetermined time due to the influence of a noise or the like.

What is claimed is:

1. An object recognition apparatus comprising:
    a candidate image extraction unit that extracts a candidate image part, which is an image part of an object having a quantity of characteristics of a pedestrian, from a pickup image of a camera;
    a distance calculation unit that calculates a distance between a corresponding real space position and the camera on the candidate image part extracted by the candidate image extraction unit; and
    a candidate image determination unit configured to:
        set a determination area in real space at a predetermined distance in front of the vehicle and bounded by a length in an imaging direction of the camera and a width in a horizontal direction orthogonal to the imaging direction;
        determine if a first predetermined number of candidate image parts fall within the determination area based on the corresponding real space positions of the candidate image parts; and
        determine that the candidate image parts having the corresponding real space positions thereof falling within the determination area have a low possibility of being image parts of a pedestrian.

2. The object recognition apparatus according to claim 1, further comprising:
    a pedestrian image identification unit that performs pedestrian identification processing for identifying whether or not candidate image parts, which remain after excluding candidate image parts identified by the candidate image determination unit as having low possibility to be image parts of a pedestrian among the candidate image parts extracted by the candidate image extraction unit, are image parts of a pedestrian.

3. The object recognition apparatus according to claim 1, wherein the candidate image determination unit is further configured to:
    acquire a series of pickup images including a predetermined number of images over time; and
    determine a type of object of candidate image parts in the determination area in the case where the first predetermined number or more of the candidate image parts are determined to fall within the determination area in each of pickup image in the series of pickup images or in the case where an average number of times candidate image parts are determined to fall within the determination area of each of the pickup images is a second predetermined number or more.

4. The object recognition apparatus according to claim 3, wherein the predetermined number of pickup images continuously acquired over time is changed according to a travel speed of the vehicle in which the camera is mounted.

5. The object recognition apparatus according to claim 1, wherein the candidate image determination unit is further configured to:
    acquire a series of pickup images including a predetermined number of images over time; and
    determine a type of object of candidate image parts in the determination area in a case where, in pickup images of series of pickup images, the first predetermined number or more candidate image parts are determined to fall within the determination area of a first pickup image of the series of pickup images and the first predetermined number or less and a third predetermined number or more of the candidate image parts are determined to fall within the determination area of each pickup image of the series of pickup images acquired after the first pickup image.

6. The object recognition apparatus according to claim 1, wherein the candidate image determination unit is further configured to continue the determination of the type of object until a predetermined time elapses after determining the type of object of the candidate image parts in the determination area.

7. An object recognition method comprising:
    extracting candidate image parts, which are image parts of an object having a quantity of characteristics of a pedestrian, from a pickup image of a camera;
    calculating real space positions of each candidate image; and
    setting a determination area in real space at a predetermined distance in front of the vehicle and bounded by a length in an imaging direction of the camera and a width in a horizontal direction orthogonal to the imaging direction;
    determining if a first predetermined number of candidate image parts fall within the determination area based on the corresponding real space positions of the candidate image parts; and
    determining that the candidate image parts having the corresponding real space positions thereof falling within the determination area have a low possibility of being image parts of a pedestrian.

8. The object recognition method according to claim 7, further comprising:
    excluding candidate image parts that were determined to have a low possibility of being image parts of a pedestrian; and
    identifying whether or not candidate image parts, which remain after the excluding step, are image parts of a pedestrian.

9. The object recognition method according to claim 7, further comprising
    acquiring a series of pickup images including a predetermined number of images over time; and
    determining a type of object of candidate image parts in the determination area in the case where the first predetermined number or more of the candidate image parts are determined to fall within the determination area in each of pickup image in the series of pickup images or in the case where an average number of times candidate image parts are determined to fall within the determination area of each of the pickup images is a second predetermined number or more.

10. The object recognition method according to claim 9, wherein the predetermined number of pickup images continuously acquired over time is changed according to a travel speed of the vehicle in which the camera is mounted.

11. The object recognition method according to claim 7, further comprising
    acquiring a series of pickup images including a predetermined number of images over time; and determining a type of object of candidate image parts in the determination area in a case where, in pickup images of series of pickup images, the first predetermined number or more candidate image parts are determined to fall within the determination area of a first pickup image of the series of pickup images and the first predetermined number or less and a third predetermined number or more of the candidate image parts are determined to fall within the determination area of each pickup image of the series of pickup images acquired after the first pickup image.

12. The object recognition method according to claim 7, further comprising
continuing the determining of the type of object until a predetermined time elapses after determining the type of object of the candidate image parts in the determination area.

13. An object recognition system comprising:
a camera mounted on a vehicle; and
a processor configured to:
   extract a candidate image part, which is an image part of an object having a quantity of characteristics of a pedestrian, from a pickup image from the camera;
   calculate a distance between a corresponding real space position and the camera on the candidate image part extracted by the candidate image extraction unit; and
   set a determination area in real space at a predetermined distance in front of the vehicle and bounded by a length in an imaging direction of the camera and a width in a horizontal direction orthogonal to the imaging direction;
   determine if a first predetermined number of candidate image parts fall within the determination area based on the corresponding real space positions of the candidate image parts; and
   determine that the candidate image parts having the corresponding real space positions thereof falling within the determination area have a low possibility of being image parts of a pedestrian.

14. The object recognition system according to claim 13, wherein the processor is further configured to perform pedestrian identification processing for identifying whether or not candidate image parts, which remain after excluding candidate image parts determined to have a low possibility to be image parts of a pedestrian among the candidate image parts, are image parts of a pedestrian.

15. The object recognition system according to claim 13, wherein the processor is further configured to:
   acquire a series of pickup images including a predetermined number of images over time; and
   determine a type of object of candidate image parts in the determination area in the case where the first predetermined number or more of the candidate image parts are determined to fall within the determination area in each of pickup image in the series of pickup images or in the case where an average number of times candidate image parts are determined to fall within the determination area of each of the pickup images is a second predetermined number or more.

16. The object recognition system according to claim 15, wherein the predetermined number of pickup images continuously acquired over time is changed according to a travel speed of the vehicle in which the camera is mounted.

17. The object recognition system according to claim 13, wherein the processor is further configured to:
   acquire a series of pickup images including a predetermined number of images over time; and
   determine a type of object of candidate image parts in the determination area in a case where, in pickup images of series of pickup images, the first predetermined number or more candidate image parts are determined to fall within the determination area of a first pickup image of the series of pickup images and the first predetermined number or less and a third predetermined number or more of the candidate image parts are determined to fall within the determination area of each pickup image of the series of pickup images acquired after the first pickup image.

18. The object recognition apparatus according to claim 13, wherein the processor is further configured to continue the determination of the type of object until a predetermined time elapses after determining the type of object of the candidate image parts in the determination area.

* * * * *